United States Patent
Rossi et al.

(10) Patent No.: US 12,012,730 B2
(45) Date of Patent: Jun. 18, 2024

(54) METHOD FOR IDENTIFYING THE SOURCE OF PRESSURE TRANSIENT IN A WATER NETWORK

(71) Applicant: SUEZ GROUPE, Paris la Defense (FR)

(72) Inventors: Andrea Rossi, Paris la Défense (FR); David Duccini, Paris la Défense (FR); Huan Yin, Paris la Défense (FR); Guillaume Cussonneau, Paris la Défense (FR)

(73) Assignee: SUEZ INTERNATIONAL (FR)

( * ) Notice: Subject to any disclaimer, the term of this patent is extended or adjusted under 35 U.S.C. 154(b) by 560 days.

(21) Appl. No.: 17/281,283

(22) PCT Filed: Oct. 1, 2019

(86) PCT No.: PCT/EP2019/076588
§ 371 (c)(1),
(2) Date: Mar. 30, 2021

(87) PCT Pub. No.: WO2020/070124
PCT Pub. Date: Apr. 9, 2020

(65) Prior Publication Data
US 2022/0002984 A1 Jan. 6, 2022

Related U.S. Application Data

(60) Provisional application No. 62/739,426, filed on Oct. 1, 2018.

(51) Int. Cl.
G06F 16/28 (2019.01)
E03B 7/00 (2006.01)
(Continued)

(52) U.S. Cl.
CPC .............. *E03B 7/075* (2013.01); *E03B 7/003* (2013.01); *G01M 3/2815* (2013.01);
(Continued)

(58) Field of Classification Search
CPC ...... E03B 7/075; E03B 7/003; G01M 3/2815; G05B 17/02; G06F 16/285
See application file for complete search history.

(56) References Cited

U.S. PATENT DOCUMENTS 8,341,106 B1 * 12/2012 Scolnicov ................ G06N 7/01
702/50
10,030,818 B2 7/2018 Hoskins et al.
2010/0313958 A1 * 12/2010 Patel ........................ E03B 7/071
137/552

OTHER PUBLICATIONS

International Search Report dated Dec. 11, 2019 in corresponding PCT International Application No. PCT/EP2019/076588.
(Continued)

*Primary Examiner* — Manuel A Rivera Vargas
(74) *Attorney, Agent, or Firm* — OSTROLENK FABER LLP

(57) ABSTRACT

A method for identifying the source of pressure transients in a water distribution network comprising a plurality of high-frequency pressure sensors installed therein. The method includes an acquisition step to acquire a plurality of pressures values for each high frequency pressure sensor during a preset time limit, said plurality of pressures values defining a sampled pressure variation record nearby each sensor during said preset time limit; a detection step for detecting transient events amongst the sampled pressure variation record; a grouping step for grouping detected transient events amongst the sampled pressure variation record; and a localization step for localizing the source of said grouped transient events in function of said sampled pressure variation records.

13 Claims, 4 Drawing Sheets

(51) Int. Cl.
*E03B 7/07* (2006.01)
*G01M 3/28* (2006.01)
*G05B 17/02* (2006.01)
*G06Q 10/0631* (2023.01)
*G06Q 50/06* (2012.01)

(52) U.S. Cl.
CPC ........... *G05B 17/02* (2013.01); *G06F 16/285* (2019.01); *G06Q 10/06313* (2013.01); *G06Q 50/06* (2013.01)

(56) References Cited

OTHER PUBLICATIONS

Written Opinion dated Dec. 11, 2019 in corresponding PCT International Application No. PCT/EP2019/076588.

* cited by examiner

METHOD FOR IDENTIFYING THE SOURCE OF PRESSURE TRANSIENT IN A WATER NETWORK

CROSS-REFERENCE TO RELATED APPLICATIONS

The present application is a 35 U.S.C. §§ 371 national phase conversion of PCT/EP2019/076588, filed Oct. 1, 2019, which claims priority to U.S. Provisional Application No. 62/739,426, filed Oct. 1, 2018, the contents of which are incorporated herein by reference. The PCT International Application was published in the English language.

TECHNICAL FIELD

The innovation relates to the field of pressure management in water networks, especially drinking water networks.

BACKGROUND OF THE INVENTION

In the field of water network, it is well known that in order to deliver uninterrupted water supply to all the end users, water pipes must be pressurized.

However, maintaining a constant pressure in the network is something impossible as the network is a complex system made of pipes of different diameters cooperating with many external devices modifying the flow of the water in the pipes.

It is a general objective to maintain the water flow as laminar as possible, as a rapid change in the pressure on the mass of a fluid at a given point caused by the abrupt change in the conditions of the permanent flow, which is called a pressure transient, generate many undesirable effects as:

Structural failure of pipes or accessories because of excessive positive or negative pressure;
Deterioration of connections and joints;
Cavitation due to absolute pressure lower than the saturated vapor pressure, including possible water column separation;
Sanitary risks of water contamination for infiltrations due to negative relative pressure;
Deterioration of the mechanical resistance of the pipelines because of cyclic loading, called pipe fatigue.

The pressure transient regulation is therefore an important objective in the field of drinking-water network management, but dealing with pressure transient regulation is a complicated objective and is hardly predictable.

Indeed, a pressure transient magnitude (difference between the positive and the negative pressure peaks) depends mainly on:

The amplitude of the variation in the velocity of the flow;
The velocity at which the change in the conditions of the flow is happening (e.g. the time of closing of the valve);
The characteristics of the fluid;
The material, diameter, thickness and installation conditions of the pipeline in which the pressure variation is generated.

The transient propagates on the network as a pressure wave. As a general role, all the singularities in the network will impact the propagation of the pressure wave (reflection, transmission). The main singularities that impact the propagation of the pressure waves are:

Water tanks and reservoirs;
Changes in the diameter of the pipe;
Dead ends;
Antennas/Tees/junctions.

The dissipation of the pressure wave with time is due to the head losses in the network.

As a consequence of what above, the shape of the pressure fluctuation caused by a transient that is observed on a fix measurement site depends mainly on:

How the pressure transient has been generated (amplitude and rapidity of change in the velocity of the fluid);
The characteristics of the fluid;
How the pressure wave propagates on the network, which in turn depends mainly on the characteristics of the network in which the wave is moving (length, level of meshing, head-losses, presence of water tanks and dead ends, installation conditions, etc.).

Therefore, it appears very complicated to anticipate how and when a transient event will occur, and it remains problematic to determine the source of a pressure transient in a network when such transient is detected.

SUMMARY OF THE INVENTION

The general purpose of the invention is therefore to:
reduce the pressure of the network to the minimum value;
reduce to the minimum the pressure variations on the network;
eliminate or reduce the amplitude of all pressure transients.

More precisely the problem solved by the invention is how to minimize at all time the negative effects of pressure on drinking water networks and at the same time provide uninterrupted drinking water supply to all end users.

In order to solve these problem we propose a method for identifying the source of pressure transients in a water distribution network comprising a plurality of high-frequency pressure sensors installed therein, said method comprising:

An acquisition step to acquire a plurality of pressures values for each high frequency pressure sensor during a preset time limit, said plurality of pressures values defining a sampled pressure variation record nearby each sensor during said preset time limit;
A detection step for detecting transient events amongst the sampled pressure variation record;
A grouping step for grouping detected transient events amongst the sampled pressure variation record; and
A localization step for localizing the source of said grouped transient events in function of said sampled pressure variation records.

Therefore this method allows to detect efficiently and precisely the origin of a pressure transient event by analyzing a large amount of data acquired by the high-frequency sensor installed in the network.

Advantageously and in a non-limiting manner, in the detection step, for each sampled pressure variation record of each high-frequency pressure sensor, each pressure variation exceeding a predefined threshold for a short-time predefined timeframe is detected as a transient event. This allows to detect with a low calculation need, quickly and efficiently the pressure transient events in a large data set.

Advantageously and in a non-limiting manner, the grouping step comprises a preliminary filtering step configured to remove from grouping irrelevant transient events in function of their shape and/or amplitude and/or frequency and/or duration. Therefore the method implementation can be more efficient, and involving less calculation, by removing irrelevant transient events.

Advantageously and in a non-limiting manner, in the grouping step, every detected transient event is associated with a corresponding signature, the transient events being grouped with other transient events of the same record having a corresponding signature. Therefore every transient can be classified in function of some physical or temporal characteristic, making it easier to compare transient events.

The signature, in the meaning of this invention, is a physical or temporal characteristic of a pressure transient event, as length, magnitude, signal frequency, signal shape or any other information of this type. A signature can also be a combination of a plurality of these characteristics in order to classify each transient.

Advantageously and in a non-limiting manner, the localization step comprises a cross-checking sub-step comparing said grouped transients with external information data received from at least one other device cooperating with said water distribution network, in order to correlate a group of transient events with a cooperating device operation. This feature allows a strongly efficient and relatively fast solution to localize a source of pressure transients based on a group of transient event of a same record.

Advantageously and in a non-limiting manner, the external information data comprises a least a data related to a pump operation and/or a valve operation and/or an important customer consumption and/or a fire hydrant operation. Indeed, these data allows to detect a large majority of pressure transient events in a water network.

The important customer consumption being understood as an abnormal and/or rare, or a least a very notable, consumption of water in the network, especially regarding industrial water consumption.

Advantageously and in a non-limiting manner, said external information data comprises a timestamp associated with a cooperating device operation or a position associated with the cooperating device operation. Therefore it takes a very low calculation time to implement the cross-check step.

Advantageously and in a non-limiting manner, the grouping step comprises the grouping of transient events detected in different records associated with different sensors, in a same timeframe. This allows to determine and gather transient events from different records, so different sensors, in order to correlate them together.

Advantageously and in a non-limiting manner, said same timeframe being calculated in function of a pressure-wave propagation model in said water network, in order to group each transient being potentially emitted from a same source. Therefore an optimal timeframe can be calculated in order to make the different record grouping easier and more precise.

Advantageously and in a non-limiting manner, the localization step comprises a triangulation sub-step for determining a position of a transient event source in function of a group of transient events detected by different sensors in a same timeframe. This triangulation sub-step is a very efficient solution to determine the localization of the source of a pressure transient event in function of the grouped transient events obtained, their position in the network and the network topology.

Advantageously and in a non-limiting manner, the method comprises a step of severity estimation wherein every group of transient events is associated with a severity score calculated in function of the shape and/or amplitude and/or frequency and/or duration of every transient of the group and in function of the estimated localization of the group of transient events. Therefore it allows to prioritize curing or preventive measures on the network in function of the severity of each transient group.

Advantageously and in a non-limiting manner, the method comprising a mitigation step for mitigating pressure transient events in function of the localization of the source of said transient event group and/or in function of cooperating device operation. This feature allows to improve the water network management based on the transient detection, reducing the risks of pipe failure and leakages.

Advantageously and in a non-limiting manner, the method comprising a pressure modulation modulating high pressures in the water network by detecting, for each group of transient events a maximum pressure value, and to determine a regulation measure on the water network to reduce said maximum pressure value, in function of the group transient events and in function of the localization of the source of said transient event group. These features allow also to improve the water network management based on the transient detection, reducing the risks of pipe failure and leakages.

The invention also relates to a device for identifying the source of pressure transients in a water distribution network comprising a plurality of high-frequency pressure sensors installed therein, said device comprising:
  Means for acquiring a plurality of pressures values for each high frequency pressure sensor during a preset time limit, said plurality of pressures values defining a sampled pressure variation record nearby each sensor during said preset time limit;
  Means for detecting transient events amongst the sampled pressure variation record;
  Means for grouping detected transient events amongst the sampled pressure variation record; and
  Means for localizing the source of said grouped transient events in function of said sampled pressure variation records.

The invention also related to a drinking-water network comprising a plurality of high-frequency pressure sensors, and a device for identifying the source of pressure transients as exposed previously.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DESCRIPTION OF PREFERRED EMBODIMENTS

Figure 4:
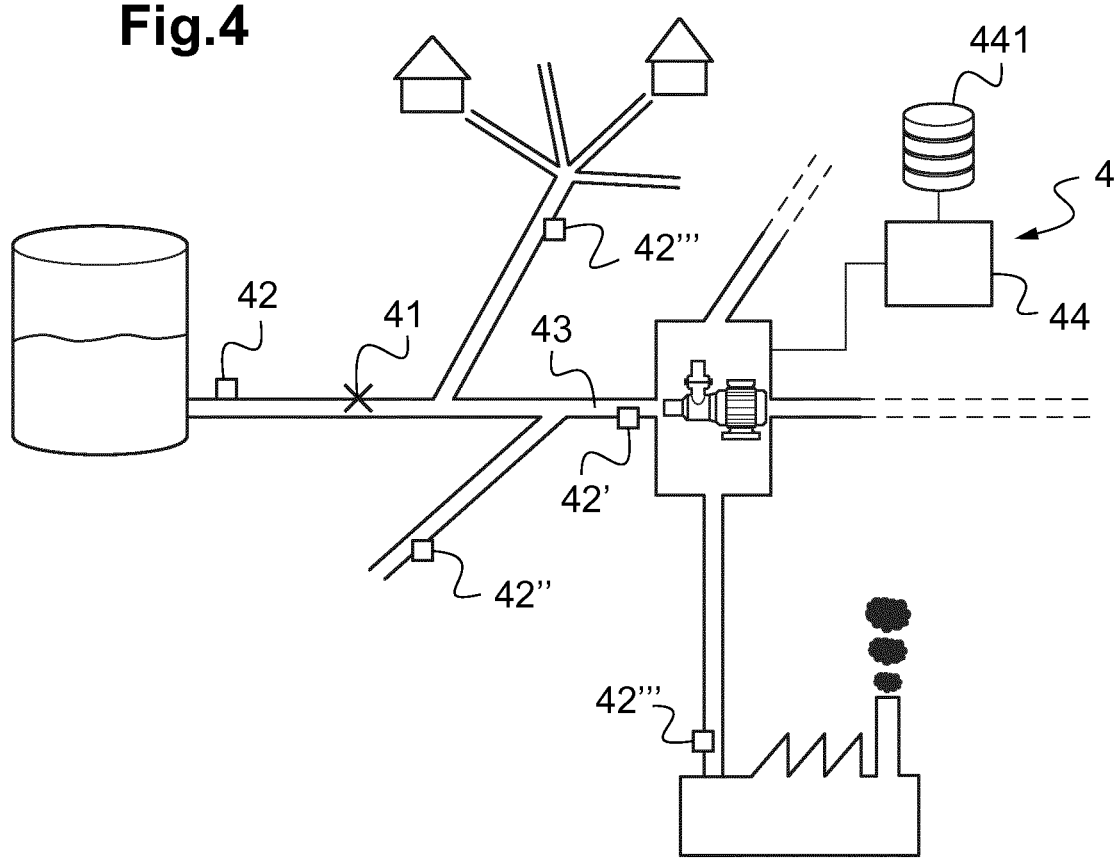
FIG. 4 is a schematic view of a water network of the invention.

According to a first embodiment of the invention, in reference of FIG. 4, a drinking water network 4 comprises a pipe network 43, a plurality of high-frequency pressure sensors 42-42''' installed in the network 43 to measure water pressure in the network in a plurality of locations of the water network.

A high-frequency pressure sensor 42-42''', said reference being further just referenced as sensor 42, is known in the art as being able to collect about 128 pressure information per second. However, in the present invention, a an amount of 10 to 25 measures par second, for instance 15 measures per second and preferably 20 measures per second, are good enough to detect pressure transient event.

These high frequency pressure sensors 42, also called pressure loggers 42, are deployed on the network to capture high resolution continuous pressure data at minimum costs.

The drinking water network 4 comprises also a device 44 for collecting data pressures of the plurality of high-frequency sensors.

The device 44 comprises means for storing 441 said data pressures, as a hard-drive, a flash-memory, or any relevant hardware material to store a large amount of data, for instance stored in a database 441, or in any other organized manner known by the man skilled in the art.

The device 44 is configured to implement a method 1 for detecting and localizing transient events in the network 4. The wording "localization" of a transient should be understood as finding the origin 41 of a pressure transient.

Indeed, as drinking water pipes 43 are be pressurized, the water pressure contributes to three major undesirable effects on water networks:

- deterioration of pipes, in other word reduction of the mechanical properties of the pipe; for instance yield strength, compressive strength, tensile strength, impact strength;
- high pressure causes degradation of plastic water pipes;
- recurrent pressure variations cause degradation of metallic pipes through a phenomenon known as "fatigue"

Particularly pressure generates internal loading of pipes that can be the cause of pipe failure when this load exceeds the mechanical properties of the pipe.

Recurrent pressure variations are also at the origin of failure for the same fatigue phenomenon.

These failures increases the volume of water losses as the volume of water lost through a leak is proportional to the pressure of the water in the pipe.

Figure 1:
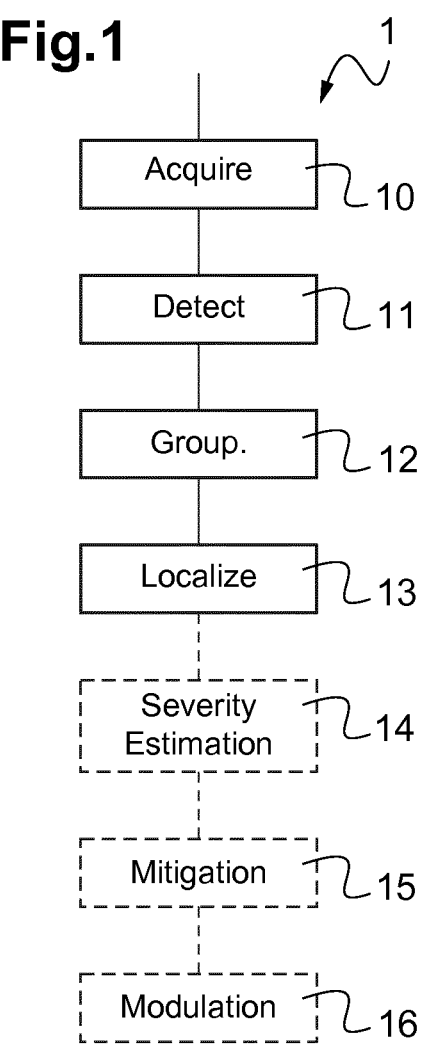
FIG. 1 is a flowchart of the method according to the first embodiment of the invention.
Figure 2:
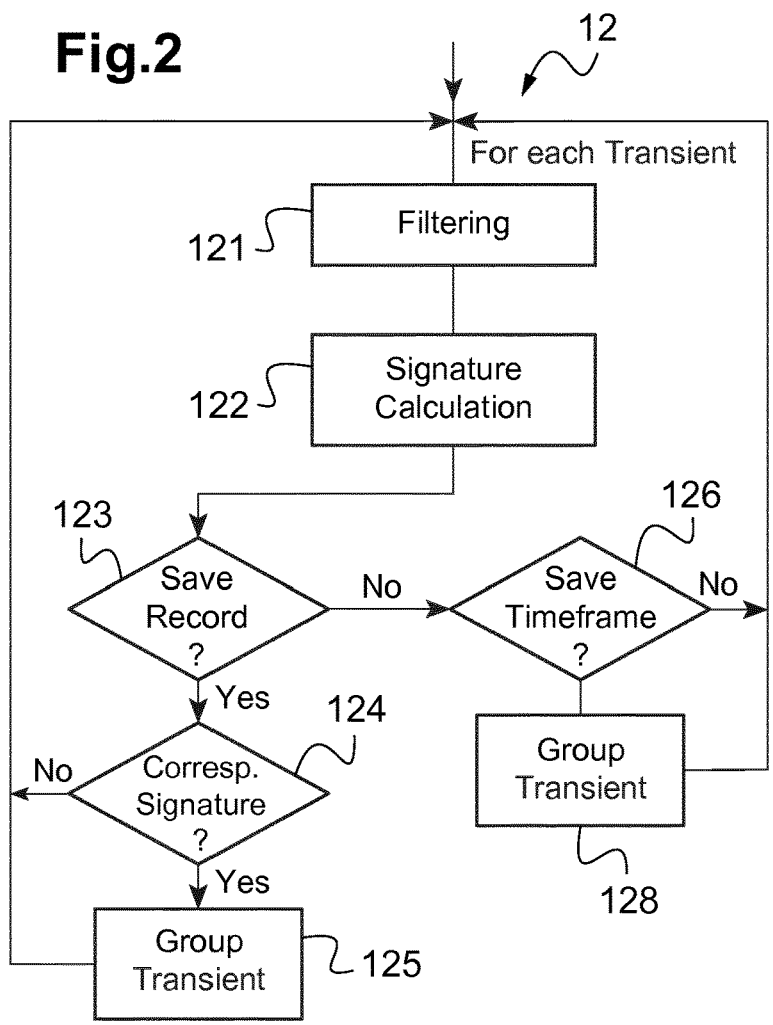
FIG. 2 is a detailed flowchart of the grouping step of the method of FIG. 1.
Figure 3:
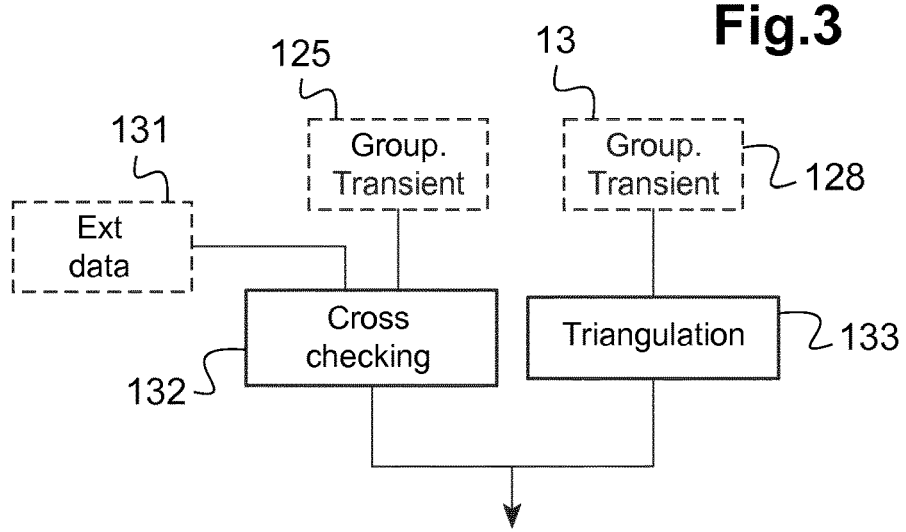
FIG. 3 is a detailed flowchart of the localizing step of the method of FIG. 1.

The method 1, according to the first embodiment of the invention, and according to FIGS. 1 to 3, comprises a first step of acquiring 10 a plurality of pressures values for each high frequency pressure sensor 42 during a preset time limit.

The set of acquired pressure values for each sensor 42 in the preset time limit defines a sampled pressure variation record nearby each sensor 42 during said preset time limit, also called record.

The preset time limit is defined as a measurement campaign, which can last for instance between a few hours, for instance 2 to 5 hours, to a plurality of days.

The time limit acquisition is only decided in function of the capacities to store the large amount of data acquired for each sensor 42 and to implement the method 1 of the invention for this large amount of data.

The method 1, can also be implemented in real time, as the acquisition campaign run, based on a predetermined sliding time-frame.

The acquisition step 10 can be preceded, in an alternate embodiment of the invention, by a sensor placement step, configured to determine the optimal position of the plurality of sensor according to the topology and structure of the water network 4.

This sensor placement step is used to determine the optimum number of loggers and their locations. In case sensors 42 are already deployed, the algorithm allows to determine which ones could be relocated, as they are redundant or do not bring high added value on their current location.

Then, the method 1 implement a detection step 11 for detecting transient events 41 amongst the sampled pressure variation records.

The detection of pressure transients, in other word all abrupt pressure variations in the network, is calculated in this first embodiment of the invention in function of the difference between maximum and minimum pressure over various small time windows, for instance the preset time limit, to detect the transient events and distinguish it from ordinary functioning. However the detection step 11 is not limited to this particular method and can be function of many other parameters of pressure signal, as variation, slope and/or peaks values to take account of the average variability on the records.

So, the detection step 11 comprises a first sub-step of filtering 121 the acquired data for every record, in order to remove all variation which are not relevant to be a transient event, but are supposed to be ordinary pressure variation in the network.

When the pressure transient events, also simply referred as transient, are detected in every record, the method implements a step of grouping 12 transient.

The grouping step 12 comprises, in reference of FIG. 3, in this first embodiment of the invention, two different grouping strategies 125, 128.

However in an alternate embodiment of the invention, the grouping step 12 can comprises either only one 125, 128 of these strategies or use other grouping strategies.

First of all, by grouping it must be understood that transients are classified and gathered into groups of transient events having the same source.

A pressure logger may detect several transient events per day.

Some of these events might be caused by the same source. Therefore, for the purpose of identifying the source and easing the data analytics, transients from the same source shall be considered as a single group of events. This is done through a twofold analysis:

The profile (shape, amplitude and duration) of the measured high-frequency data of various events is compared. The pressure wave generated by a source will have similar physical characteristics. If several events detected by the same device show the same data profile, they are grouped together.

Often, transient events are generated by automated operations, and automated operations are typically happening always at the same time of the day, or at constant time intervals. The time and frequency at which the transient events are detected are analyzed over several days to search for repetitiveness. If several events show time repetitiveness, they are grouped together.

Therefore the first grouping strategy 125, consist in grouping every transient of a same record 123 having a corresponding signature 124.

The signature, in the meaning of this invention, is a physical or temporal characteristic of a pressure transient event, as length, magnitude, signal frequency, signal shape or any other information of this type. A signature can also be a combination of a plurality of these characteristics in order to classify each transient.

Therefore, when in a same record, a plurality of transient are grouped together as their signature are closely related, then it can be inferred that they were emitted by the same source 41, or from a same location of the network.

The second grouping strategy 128, consist in grouping transient of different record 123 being captured by different sensor 42 in a same timeframe 126.

In this second strategy the objective is to determine that a transient has propagated in the network and was received by a plurality of sensor.

It is also optional, in an alternate embodiment of the invention, to add a signature comparison, as the signature comparison 124 of the first grouping strategy 126; this making the grouping from different sensors even more accurate.

In order to determine what timeframe 126 must be used, a solution is to determine the size of the network 4 and the duration for the wave-propagation in the network 4. Such calculation can be based on the method described below for the triangulation step 133.

When the grouping step 12 is made, the method implement a localization step 13 for determining, for each group 123, 128 the source of the related transient event.

For the first grouping strategy 125, the localization step 13 implements a cross-checking sub-step 132.

The objective of the cross-checking sub-step 132 is to compare the signatures of the grouped transient 125 with external operational data 131.

Indeed, it is know that most of the transient events are caused by four main sources: pump operations, valve operations, large customer consumption, and fire hydrant operation.

Water companies already collect and store several data on the time of pump and motorized valve operations (through the SCADA), customer consumptions (through AMR) and hydrant operation.

These data can be available on the company database (data historian).

Figure 5:
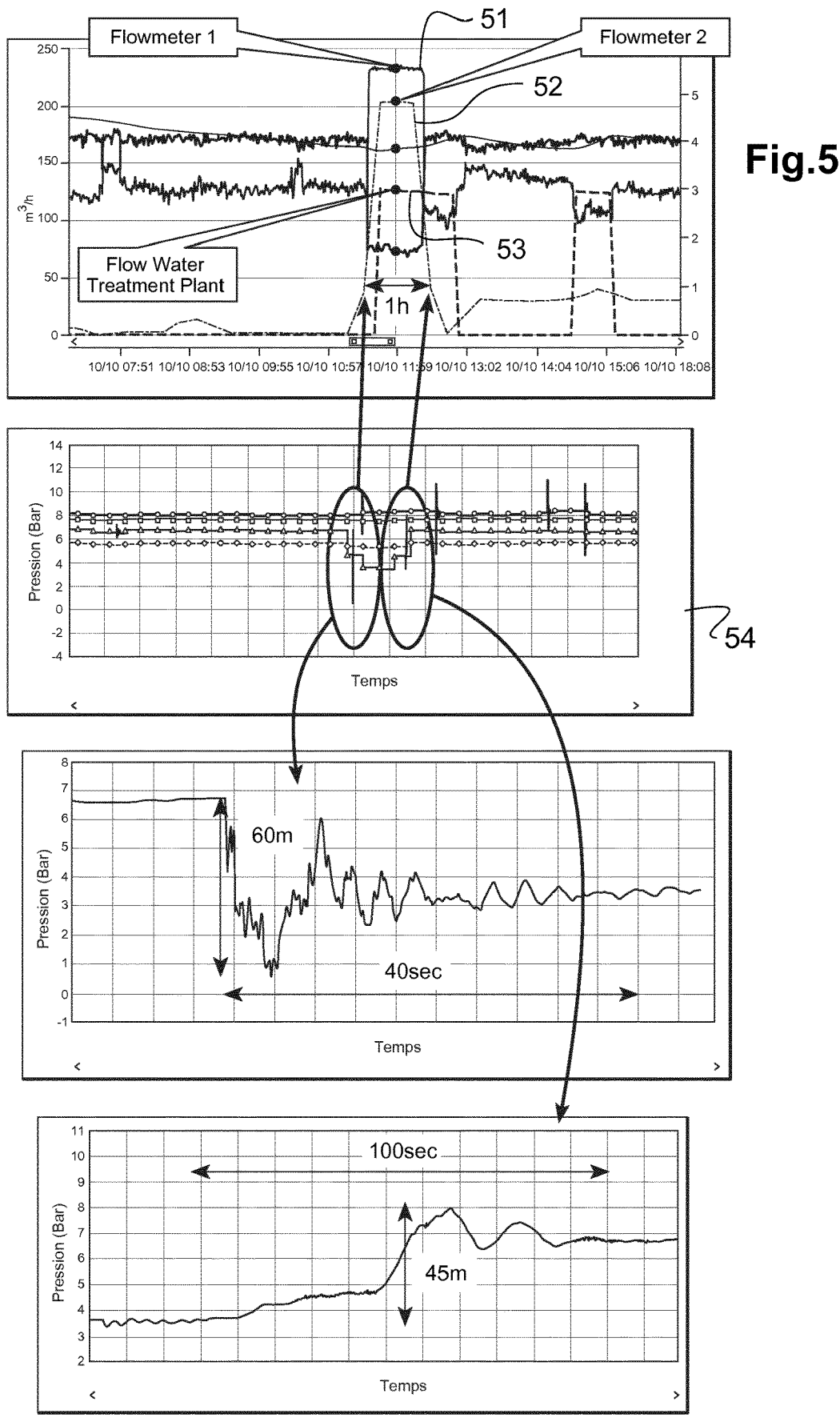
FIG. 5 is a diagram illustrating a cross-check sub-step of the method of FIG. 1.

For example, in reference of FIG. 5, the time at which transient events 51, 52 are detected are cross-checked 132 with the time at which various operations and consumptions are recorded on the water company database 54.

When a good correlation is observed, for instance in FIG. 5 the beginning 53 of an actuation of a flow water treatment plant, including repetitivities of the group of events, if any; the identified operation is defined as the cause of the group of transient events.

In this case, the external source location, in this example the flow water Treatment plant, is assigned as the source of the transient group 125.

When the cross-checking 132 step is implemented, it can improve the efficiency of the method, in a particular embodiment of the invention, to relocate pressure sensors 42 to improve the quantity and quality of high frequency pressure data.

This particular relocation step is particularly efficient when a network incorporate a relatively low number of high-frequency pressure sensors 42. Therefore, by relocating these sensors 42 we can acquire different pressure data in different position of the network to help determining that a particular transient occurs also in different position.

This relocation step can also be implemented for the following triangulation sub-step 133.

For the second grouping strategy 128, the localization step 13 implements a triangulation sub-step 133.

A pressure transient propagates on the network 4 as a pressure wave. Its velocity depends from many physical parameters. They are mainly the characteristics of the fluid and/or the material, diameter, thickness and installation conditions of the pipeline in which the pressure variation is generated.

If several pressure loggers 42 detect the same transient events, it is possible to triangulate the location of the origin of the transient by simulating its propagation according to four parameters:

The time at which each logger detected the transient

The characteristics of the fluid (always water in this application)

The material, diameter and thickness of the pipes, which is recorded on the water company GIS The topology and connections of the pipelines, which is recorded on the water company GIS The duration (distance between maximum and minimum peak) and profile of the transients measured by the various loggers is compared to validate that they are actually the same event, from the same source.

The method of STEP 3.2 is based on the relationship:

velocity=function*(network structure,material,diameter)

For example (from Watters, G. Z. (1984). *Analysis and control of unsteady flow in pipelines. 2nd edition*, Butterworth-Heinemann, USA) an equation for a transient wave speed in one-dimensional flow, also called water hammer wave speed magnitude in one-dimensional flows is:

$$a = \sqrt{\frac{K}{\rho\left(1 + \frac{DK}{eE}\psi\right)}}$$

Where a=wave speed; K=volumetric compressibility modulus of the liquid; ρ=liquid density; e=pipe wall thickness; E=pipe elasticity modulus (Young); D the inner pipe diameter, ψ=factor related with the pipe supporting condition.

The factor related with the pipe supporting condition can be determined for instance, as follow, in function of the pipe situation:

1. Pipe anchored at the upstream end only $\psi = [1/(1+e/D)][5/4 - u + 2(e/D)(1+u)(1+e/D)]$ 2. Pipe anchored against any axial movement $\psi = [1/(1+e/D)][1 - u2 + 2(e/D)(1+u)(1+e/D)]$ 3. Situation 2 plus longitudinal expansion joints along the pipeline $\psi = [1/(1+e/D)][1 + 2(e/D)(1+u)(1+e/D)]$ The water-hammer model, is also known by the man skilled in the art with the following equation:

$P = \rho C U$ (Pa)

Where:
P is the change in pressure;
ρ is the fluid density;
U is the change in fluid velocity;
C is the sonic velocity in the pipe.

The sonic velocity is the speed of sound in the pipe and is determined by a modified hooks law formula, function of the stiffness of the fluid and the pipe wall:

$$C = \sqrt{\frac{1}{\rho\left[\frac{1}{K} + \frac{D}{Ee}\right]}} \, m/s$$

Where
K Bulk modulus of fluid
E Young's modulus of pipe material
e Wall thickness of pipe The sonic velocity C is also the speed at which the pressure waves generated by water hammer travel in the pipe.

The triangulation requires that each detected pressure transient event is stored with the position of the sensor 42 at the acquisition time; the triangulation calculation being made based on the sensor 42 position at the acquisition time and based on the known network 4 topology.

A strong advantage of this triangulation sub-step 133 is that no hydraulic modeling is required, therefore the computation is significantly faster, and can be run on real time.

Therefore, with the two ways to localize a transient source 41, the cross-checking sub-step 132 and the triangulation sub-step 133, the method 1 of the invention allows to determine efficiently the source of relevant pressure transient events.

In a particular embodiment of the invention, the method also comprise a severity estimation 14 of each group 125, 128 of transient events.

The severity estimation step 14 comprises the calculation for each groups of transient events of a severity score for instance: low, medium and high.

In this particular embodiment, but in a non limitative manner, a severity score is calculated by the combination of two criteria:
- the amplitude of the transient, meaning the difference between the minimum and the maximum pressure within the transient event time window (higher amplitude=higher severity)
- the frequency of occurrence of the event (higher frequency=higher severity)

Then, groups are classified into low, medium and high severity according to severity score thresholds that can be determined by the man skilled in the art.

This classification by severity allows the user to distinguish between dangerous and harmless events, and to prioritize the localization step 13 and the following mitigation 15 of pressure modulation 16 steps.

Indeed, the invention also comprises, in addition to the detection and localization of the pressure transient events source, steps for solving these pressure transient events.

Therefore the method 1 comprises a step for mitigating 15 the pressure transient.

The mitigation step 15 comprises, once the sources of transients have been localized 13 through the method 1 for detecting the origin of pressure transient in a water distribution network:
- The installation of specific protection/mitigation equipment and/or accessories. A detailed design is performed to assess the need for these installations. In some cases, no installation is required, and the modification of the existing controllers/actuators can be performed to mitigate the severity of the transient; and/or
- Real-time automated operation of drinking water networks can be used to automate the mitigation phase on real-time. A controlling device, for instance the same device 44 that is running the method 1, automatically identifies possible solutions to modify the operation of automated equipment or accessories to reduce the amplitude and frequency of the most critical group of transients. For instance: extending the start/stop time of pumping, extending the open/close time of motorized valves, changing the pump scheduling in order to reduce the frequency of pump start/stop, etc. This operation can be performed by progressive iterations up to the point on which the severity score calculated for the group of transients is considered acceptable. If, after a certain number of iteration, very limited improvement is observed, the process is suspended and a warning is raised.

The method 1 also comprises a step of pressure modulation 16, which can be independent or combined with the mitigation step 15.

The potential for pressure reduction and real-time pressure regulation is identified by analyzing the pressure measures.

The pressure regulation of the target network is defined in order to minimize the pressure excesses at all time.

The pressure modulation step 16 targets the operation of Pressure Regulating Valves (PRV), pumps and water tanks. The installation of PRVs and/or electronic actuators/controllers and/or other hydraulic accessories may be required as a consequence, so as optimum pressure regulation of the network 4, in order to minimize the average pressure on the network 4 and the average daily pressure variations.

The pressure modulation step 16 can be optimized through the utilization of an advanced decision support tool based on hydraulic model. The optimization is performed by the use of a software method with power and computational intelligence to create and evaluate hundreds of thousands of alternative plans.

An algorithm allows to converge to a limited number of optimal solutions. A hydraulic model of the network is required to perform the optimization. The parameters of the optimization problem are:
- The cost of the required works, equipment, accessories network arrangements;
- The volume of leakages, depending on the pressure on the pipes
- The probability of failure, depending on a statistical or multicriteria analysis, taking into account the maximum pressure on each pipe and several other parameters such as the pipe age, material, diameter, soil, etc. . . .
- The proportional relation between the maximum pressure and the probability of failure of each pipe, calculated as a result of the statistical or multicriteria analysis on the previous point.
- The costs associated with the water losses and the bursts (repair costs, cost of water production, and other costs . . . )

The invention also related to an asset management method for optimizing pipe deterioration.

It is known in the prior art that maximum pressure is used as a co-variable for pipe deterioration modeling for pipe failure prediction and prioritization of pipe renewal plan. This maximum pressure is calculated through hydraulic modeling. The innovation at this stage is to use the maximum pressure measured through the high-frequency measurement campaign (>20 measures/second), instead of the maximum pressure from the model. To do so, it is necessary to:
- Determine the maximum pressure of each measurement point, over a period of few weeks Extrapolate this value to all pipes of the studied network. This is done through linear extrapolation of the Hydraulic Grade Line (HGL) between different measurement points. Then, pressure of each pipe is calculated by subtraction of the HGL—altitude of the pipe.

This allows to significantly improve the accuracy of pipe failure prediction models.

The invention claimed is:

1. A method for identifying the source of pressure transients in a water distribution network comprising a plurality of high-frequency pressure sensors installed therein, said method comprising:
    an acquisition step to acquire a plurality of pressures values for each high frequency pressure sensor during a preset time limit, said plurality of pressures values defining a sampled pressure variation record nearby each sensor during said preset time limit;
    a detection step for detecting transient events amongst the sampled pressure variation record, wherein every detected transient event is associated with a corresponding signature;
    a grouping step for grouping detected transient events in the sampled pressure variation record; the transient events corresponding to the same signature being grouped together; and
    a localization step for localizing the source of said grouped transient events in function of said sampled pressure variation records, comprising a cross-checking sub-step comparing said grouped transients with external information data received from at least one other device cooperating with said water distribution network, in order to correlate a group of transient events with a cooperating device operation; the external information data comprising a least information related to a pump operation and/or a valve operation and/or an important customer consumption and/or a fire hydrant operation.

2. The method according to claim 1, wherein the cross-checking sub-step comprises comparing said grouped transients with operations and consumptions records of a water company database.

3. The method according to claim 1, comprising a pressure modulation step modulating high pressures in the water network by detecting, for each group of transient events a maximum pressure value, and to determine a regulation measure on the water network to reduce said maximum pressure value, in function of the group transient events and in function of the localization of the source of said transient event group.

4. The method according to claim 1, wherein, in the detection step, for each sampled pressure variation record of each high-frequency pressure sensor, each pressure variation exceeding a predefined threshold for a short-time predefined timeframe is detected as a transient event.

5. The method according to claim 1, wherein the grouping step comprises a preliminary filtering step configured to remove from grouping irrelevant transient events in function of their shape and/or amplitude and/or frequency and/or duration.

6. The method according to claim 1, said external information data comprising a timestamp associated with a cooperating device operation or a position associated with the cooperating device operation.

7. The method according to claim 1, wherein the grouping step comprises the grouping of transient events detected in different records associated with different sensors, in a same timeframe.

8. The method according to claim 7, wherein said same timeframe being calculated in function of a pressure-wave propagation model in said water network, in order to group each transient being potentially emitted from a same source.

9. The method according to claim 7, wherein the localization step comprises a triangulation sub-step for determining a position of a transient event source in function of a group of transient events detected by different sensors in a same timeframe.

10. The method according to claim 1, comprising a step of severity estimation wherein every group of transient events is associated with a severity score calculated in function of the shape and/or amplitude and/or frequency and/or duration of every transient of the group and in function of the estimated localization of the group of transient events.

11. The method according to claim 1, comprising a mitigation step for mitigating pressure transient events in function of the localization of the source of said transient event group and/or in function of cooperating device operation.

12. A device configured to identify the source of pressure transients in a water distribution network comprising a plurality of high-frequency pressure sensors installed therein, said device being configured to:
    a) acquire a plurality of pressures values for each high frequency pressure sensor during a preset time limit, said plurality of pressures values defining a sampled pressure variation record nearby each sensor during said preset time limit;
    b) detect transient events amongst the sampled pressure variation record, wherein every detected transient event is associated with a corresponding signature;
    c) group detected transient events in the sampled pressure variation record, the transient events corresponding to the same signature being grouped together; and
    d) localize the source of said grouped transient events in function of said sampled pressure variation records comprising implementing a cross-checking sub-step comparing said grouped transients with external information data received from at least one other device cooperating with said water distribution network, in order to correlate a group of transient events with a cooperating device operation; the external information data comprising a least information a data related to a pump operation and/or a valve operation and/or an important customer consumption and/or a fire hydrant operation.

13. A drinking-water network comprising a plurality of high-frequency pressure sensors, and a device for identifying the source of pressure transients according to claim 12.

* * * * *